(12) United States Patent
Sonnaillon

(10) Patent No.: US 9,948,209 B2
(45) Date of Patent: Apr. 17, 2018

(54) DIGITAL CONTROLLER ARCHITECTURE FOR THREE-PHASE AC SOURCES

(71) Applicant: Pacific Power Source, Inc., Irvine, CA (US)

(72) Inventor: Maximiliano O. Sonnaillon, Santa Fe (AR)

(73) Assignee: Pacific Power Source, Inc., Irvine, CA (US)

( * ) Notice: Subject to any disclaimer, the term of this patent is extended or adjusted under 35 U.S.C. 154(b) by 89 days.

(21) Appl. No.: 14/999,533

(22) Filed: May 19, 2016

(65) Prior Publication Data

US 2016/0349818 A1    Dec. 1, 2016

Related U.S. Application Data

(60) Provisional application No. 62/179,907, filed on May 21, 2015.

(51) Int. Cl.
| | |
|---|---|
| *G06F 1/00* | (2006.01) |
| *H02M 7/5387* | (2007.01) |
| *H02M 5/27* | (2006.01) |
| *H02M 1/00* | (2006.01) |

(52) U.S. Cl.
CPC ........ *H02M 7/53873* (2013.01); *H02M 5/273* (2013.01); *H02M 7/53875* (2013.01); *H02M 2001/0025* (2013.01)

(58) Field of Classification Search
CPC ......... H02M 7/53875; H02M 7/53873; H02M 2001/0025; H02M 5/273
See application file for complete search history.

(56) References Cited

U.S. PATENT DOCUMENTS

| | | |
|---|---|---|
| 5,270,622 A | 12/1993 | Krause |
| 6,201,720 B1 | 3/2001 | Tracy et al. |
| 6,466,465 B1 | 11/2002 | Marwali |
| 6,919,650 B2 | 7/2005 | Dang |
| 8,552,589 B2 | 10/2013 | Ghosh et al. |
| 8,816,617 B2 | 8/2014 | Yanagita et al. |
| 2005/0174076 A1* | 8/2005 | Katanaya .......... H02M 7/53873 318/400.28 |
| 2015/0311800 A1* | 10/2015 | Katayama ............. H02M 3/158 323/235 |

OTHER PUBLICATIONS

Analog Devices, Fundamentals of Direct Digital Synthesis (DDS), Tutorial, Oct. 2008, USA.

* cited by examiner

*Primary Examiner* — Xuxing Chen
(74) *Attorney, Agent, or Firm* — Gibbs & White P.C.; Franklin E. Gibbs

(57) ABSTRACT

Digital controller architecture for three-phase AC sources includes a phase accumulator, a command control, and a synchronization generator that are utilized to synchronize three controllers. Each controller provides the input to a separate power stage.

4 Claims, 4 Drawing Sheets

DIGITAL CONTROLLER ARCHITECTURE FOR THREE-PHASE AC SOURCES

RELATED APPLICATIONS

This application claims priority under 35 U.S.C. § 119 to U.S. Provisional Application No. 62/179,907 filed on May 21, 2015 the contents of which are incorporate herein by reference in its entirety.

FIELD OF THE INVENTION

This invention generally relates to power supplies, power converter systems, and the like.

BACKGROUND OF THE INVENTION

Three phase alternating current (AC) power converters have numerous applications, such as motor control, solar inverters, wind energy and uninterruptible power supplies (UPS). FIG. 1 identifies a conventional circuit topology based on six transistors with antiparallel diodes in the power stage (15). The six transistors are independently turned on and off based on six pulse width modulated (PWM) signals generated by a controller (10). Modern implementations make use of a microprocessor or gate array to directly control the power stage switching. In conventional implementations, digital waveform synthesis makes use of a phase accumulator (11) as a time base. The phase accumulator is used to generate a set of reference waveforms (12), usually based on look-up tables and/or mathematical functions. The reference waveforms are used as the setpoint of the control loops (13) that regulate the PWM outputs (14) based on feedback from the power stages. The feedback depends on the converter type, and can be voltage and/or current measured at the power stage.

A conventional method to generate sinewaves and other periodic waveforms, usually referred as direct digital synthesis (DDS), is shown in FIG. 2. DDS is based on a look-up table (55) that stores one full period of the waveform to be synthesized, containing a number of samples exactly equal to a power of two (e.g. $2^{10}$=1024). There is a phase accumulator register (53), an unsigned integer number (e.g. 32-bit), that stores the phase of the generated waveform at any given time. In order to simplify the description, the common case of 32-bit word numbers is used in the figure, but the same concept is applicable to any word size.

A value of zero in the phase accumulator generates the first sample in the waveform table, and the maximum value (e.g. $2^{32}-1$) generates the last sample in the table. The phase accumulator (53) gets incremented at a fixed rate determined by an accurate clock (58), usually based on a crystal oscillator, to provide high accuracy and stability at the output frequency. At each sampling time, the output of the phase accumulator is sampled by (57) and incremented (51) by a phase delta (50). The bigger the phase delta, the faster the phase accumulator will go from 0 to its maximum value ($2^{32}-1$), thus determining the output frequency as:

$$F_{out} = F_{clock} \times phase\_delta / 2^{32} \quad \text{equation (1)}$$

Since the phase accumulator and phase delta are both 32-bit unsigned integers, their sum can be a 33-bit number in case of overflow. DDS is based on ignoring this most significant bit (MSB) (bit 33) by masking the 32 least significant bits (LSBs). When the sum exceeds the maximum 32-bit value, the phase accumulator automatically restarts a new cycle without any extra operation.

The accumulator holds the phase information in a 32-bit value, which gives high resolution and accuracy for phase and frequency, but a look-up table with $2^{32}$ values would not be practical in most applications. DDS is based on a table with fewer elements, typically in the order of 1024($2^{10}$), and uses the MSBs (54) of the phase accumulator to address the corresponding table index.

The size of the table affects output distortion because each different phase value does not have a corresponding sample in the table. In high frequency applications, a low pass filter (56) can be used to successfully attenuate this effect. For low frequency output waveforms and when high accuracy is required, interpolation (56) between table values can substantially reduce distortion and mitigate the effect of a limited size table.

In certain applications the three-phase inverter topology presents important limitations, such as in the output voltage level and lack of flexibility in the possible output connections. To overcome these limitations, three separate single-phase inverters can be used to generate the three-phase output, as shown in FIG. 3. This topology employs a higher number of components, but allows full flexibility in the output connections, which is critical for some applications such as programmable AC supplies. Each single-phase inverter (27, 35, 41) generates an independent output and is controlled by a separate controller (20, 21, 22), as opposed to a single controller as FIG. 1.

State of the art technology in digital controllers allows high performance control of power converters, but the available resources can limit this performance. If a single digital controller is used to operate the three single-phase inverters of FIG. 3, the achievable performance would be significantly affected. For example, CPU (central processing unit) time is compromised when executing 3 loops in parallel, thus causing a reduction in the sampling time and consequently to the control loops bandwidth. Other limited resources are ADC modules, PWM generators, analog comparators and memory. This limitation makes necessary the use of 3 separate controllers where high performance (e.g. high accuracy, fast response) is required, such as in test and measurement applications.

In three-phase applications, the three converters of FIG. 3 need to generate the same frequency and keep an accurate phase shift of 120 degrees. Some type of mechanism must be used to synchronize the three waveform synthesizers (24, 32, 38) that runs in each controller. A conventional way of synchronizing the three controllers is shown in FIG. 3. Phase A controller (20) has a time base generator based on a phase accumulator (23), which feeds its local waveform synthesizer (24). The waveform synthesizer generates a reference to be used by the control loops and also generates a synchronization signal (28), which can be an analog signal (e.g. a sinewave) or a digital signal (e.g. a square wave). The other two controllers (21, 22) take the sync signal (28) to synchronize their local phase accumulators (31, 37) by means of a phase locked loop (PLL) (30, 36). The local time base generated by the PLLs is used by the individual waveform synthesizers (32, 38) to feed the voltage loops (33, 39). In order to provide reduced noise and ripple, the PWM generators (26, 34, 40) can also be synchronized in frequency and interleaved to switch with a predefined phase shift. This is achieved by means of a PWM sync signal (29), which is usually a digital signal of the same frequency as the PWM.

The drawback of the scheme in FIG. 3 is that the PLL, or similar synchronization circuit, has frequency and/or phase errors during transients (e.g. frequency changes). In programmable supplies for test and measurement applications, where high accuracy is required to provide consistency and repeatability, phase errors are highly undesired.

What is needed is a system with negligible phase errors between controllers.

SUMMARY OF THE INVENTION

A digital controller for three phase AC sources is claimed and includes a first, second, and third controller.

The first controller has a phase accumulator and command control, the output of the phase accumulator and command control provides input to a waveform synthesizer and a command processor. The waveform synthesizer provides a reference input to a control loops and the command processor provides a command input to the control loops and a synchronization generator providing an input to the control loops. The control loops provides an input to a pulse width modulator and the pulse width modulator provides an input to the power stage. The power stage provides a feedback to the control loops;

A second controller receives and adds the output of the phase accumulator and the command control to provide an input to a second controller waveform synthesizer. The outputs of the phase accumulator and command control forming an input to a second controller command processor, and the second controller waveform synthesizer provides and input to a second controller control loops and the second controller command processor provides an input to the second controller control loops and the synchronization generator provides an input to the second controller control loops. The second controller control loops provides an input to a second controller pulse width modulator and the second controller pulse width modulator provides an input to the second power stage. The second power stage provides a feedback to the second controller control loops.

The third controller receives and adds the output of the phase accumulator and the command control to provide an input to a third controller waveform synthesizer. The outputs of the phase accumulator and command control forming an input to a third controller command processor. The third controller waveform synthesizer provides an input to a third controller control loops and the third controller command processor provides an input to the third controller control loops and the synchronization generator provides an input to the third controller control loops. The third controller control loops provides an input to a third controller pulse width modulator and the third controller pulse width modulator provides an input to the third power stage and the third power stage provides a feedback to the third controller control loops.

BRIEF DESCRIPTION OF THE DRAWINGS

The invention is generally shown by way of reference to the accompanying drawings in which.

DETAILED DESCRIPTION OF THE INVENTION

Figure 4:
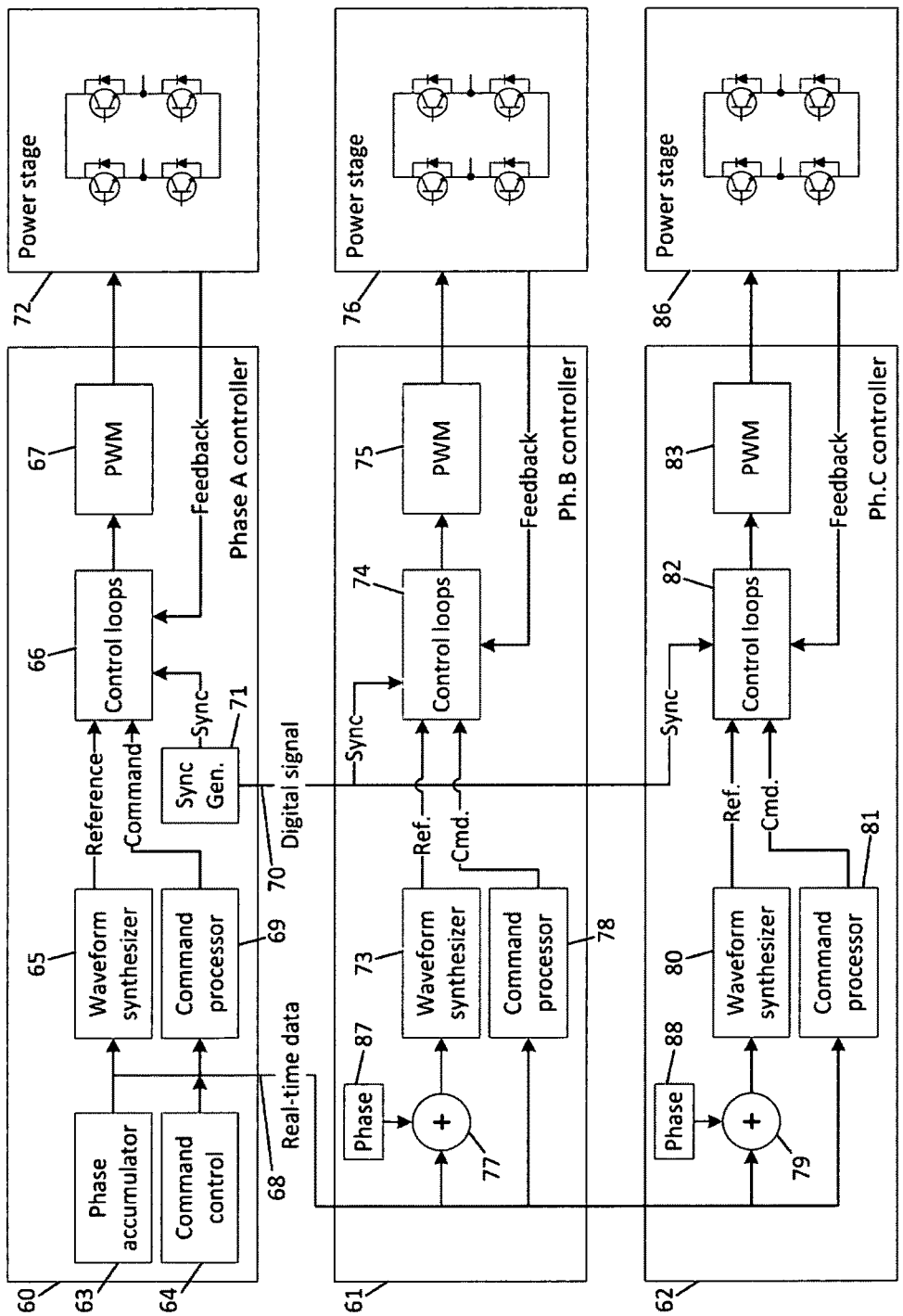
FIG. 4 is a schematic diagram of the preferred embodiment of this invention where three separate single-phase inverters are used to generate a three-phase output.

FIG. 4 is a block diagram of the preferred embodiment of this invention. The DDS scheme is split in two parts: the phase accumulator and the waveform synthesis. The phase accumulator is implemented only once and is unique in the whole three-phase system. Each controller implements independent waveform synthesizers that are based on the same phase accumulator. In the preferred embodiment of this invention, the phase accumulator is implemented in one of the controllers (e.g. phase A).

In an alternative embodiment, the phase accumulator is implemented in a separate device, referred to as a master controller that does not directly control a power converter. The master controller would only incorporate the phase accumulator (63), command control (64) and synchronization generator (71), to generate the real-time data (68) and digital sync signal (70) used by the 3 power stage controllers.

Figure 1:
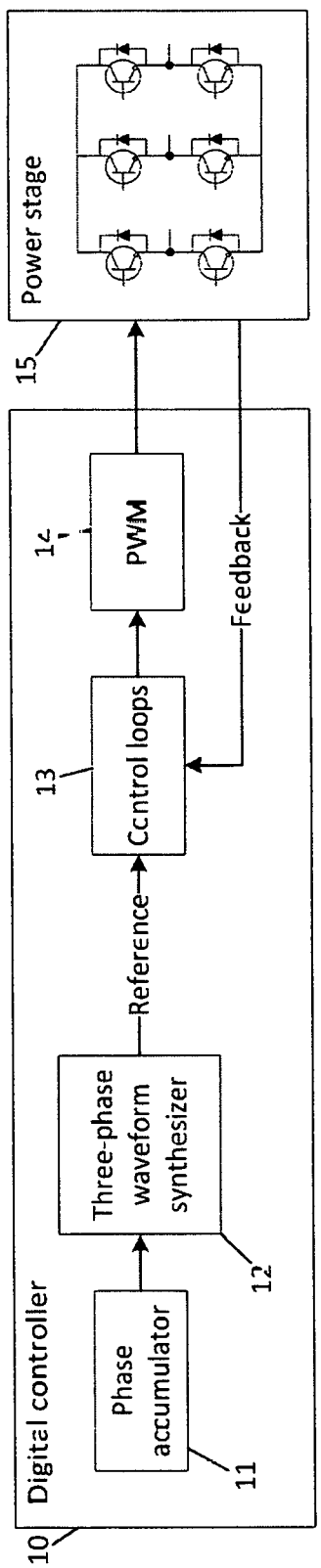
FIG. 1 is a schematic diagram of a digital controller connected to a power stage that has six transistors with antiparallel diodes.
Figure 2:
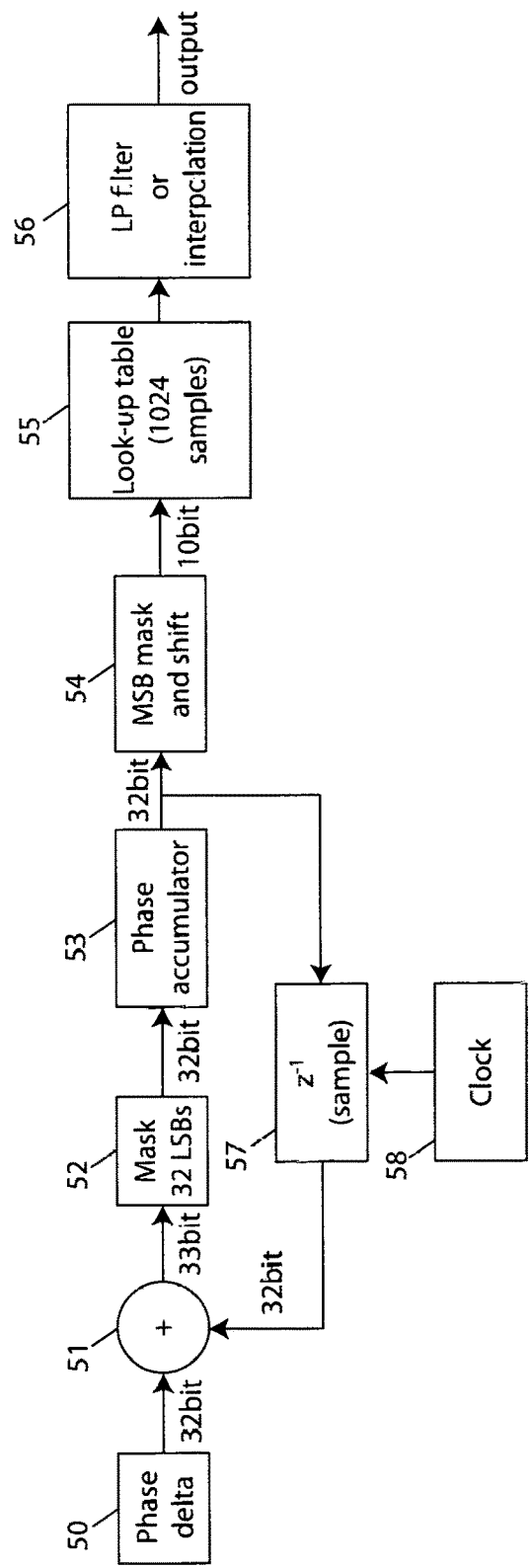
FIG. 2 is a schematic diagram of a direct digital synthesis.

Phase A controller (60) has a phase accumulator block (63), which is composed of blocks (50, 51, 52, 53, 57 and 58) of FIG. 2. The output of (63) is a 32-bit integer number that represents the waveform phase at a given time, and feeds all three waveform synthesizers (65, 73, 80). The synthesizers for phase B and C are implemented in different devices, so the phase value is transferred over a unidirectional real-time data bus (68). This bus consists of a high speed digital interface (e.g. serial peripheral interface SPI, or serial communications interface SCI) and a protocol to transfer the data. Phase A controller sends the phase value at every DDS sampling time to be used by phase B and C, thus allowing synchronized generation of the three waveforms. Phase B and C controllers (61, 62) receive the phase accumulator at each sampling time and add a fixed phase value (87, 88) by using a summing operation (77, 79) that ignores the overflow bit, as done in the DDS phase accumulation (51, 52). The phase addition implements the phase shift between the three phases. Phase shift values equal to $2^{32}*\frac{2}{3}$ and $2^{32}/3$ correspond to 240 and 120 degrees, as required for phase B and C, respectively, in the standard 3-phase rotation system. The resulting phase angle is fed to the individual waveform synthesizers (73, 80), to generate the reference waveform that is used by the control loops.

In the preferred embodiment, phase A controller (60) also generates control commands (64) and adds them to the real-time data packet, to be processed in each controller by a command processor (69, 78, 81). The purpose of this command packet is to synchronize the three controllers' actions, such as output enable and disable, and amplitude changes. The fact that the command is sent in the same packet as the phase accumulator provides reliable and accurate synchronization between phases. Further time synchronization is provided by a periodic digital signal (70) generated in phase A controller by the synchronization generator (71), and used by phase B and C to synchronize the control loop processing (74, 82), by using conventional synchronization techniques, such as external interrupts in a microprocessor. The combination of the real-time data packet and sync signal provide synchronization between the three controllers without requiring PLLs or similar circuits. The high accuracy of the synchronization is maintained even at sudden frequency of phase transients because all controllers are based on the same phase accumulator number. External command actions, for example a change in amplitude entered by a person through a keyboard and used to generate a control command (64), also make use of the synchronization scheme because they are transmitted together with the phase information, allowing simultaneous execution at each of the controllers.

In one embodiment of this invention, the three digital controllers are fed by the same unique clock oscillator, providing accurate and stable matching in their processing and interrupt timing. For example, if implemented by microprocessors, they all three would use the same central processing unit (CPU) clock.

Figure 3:
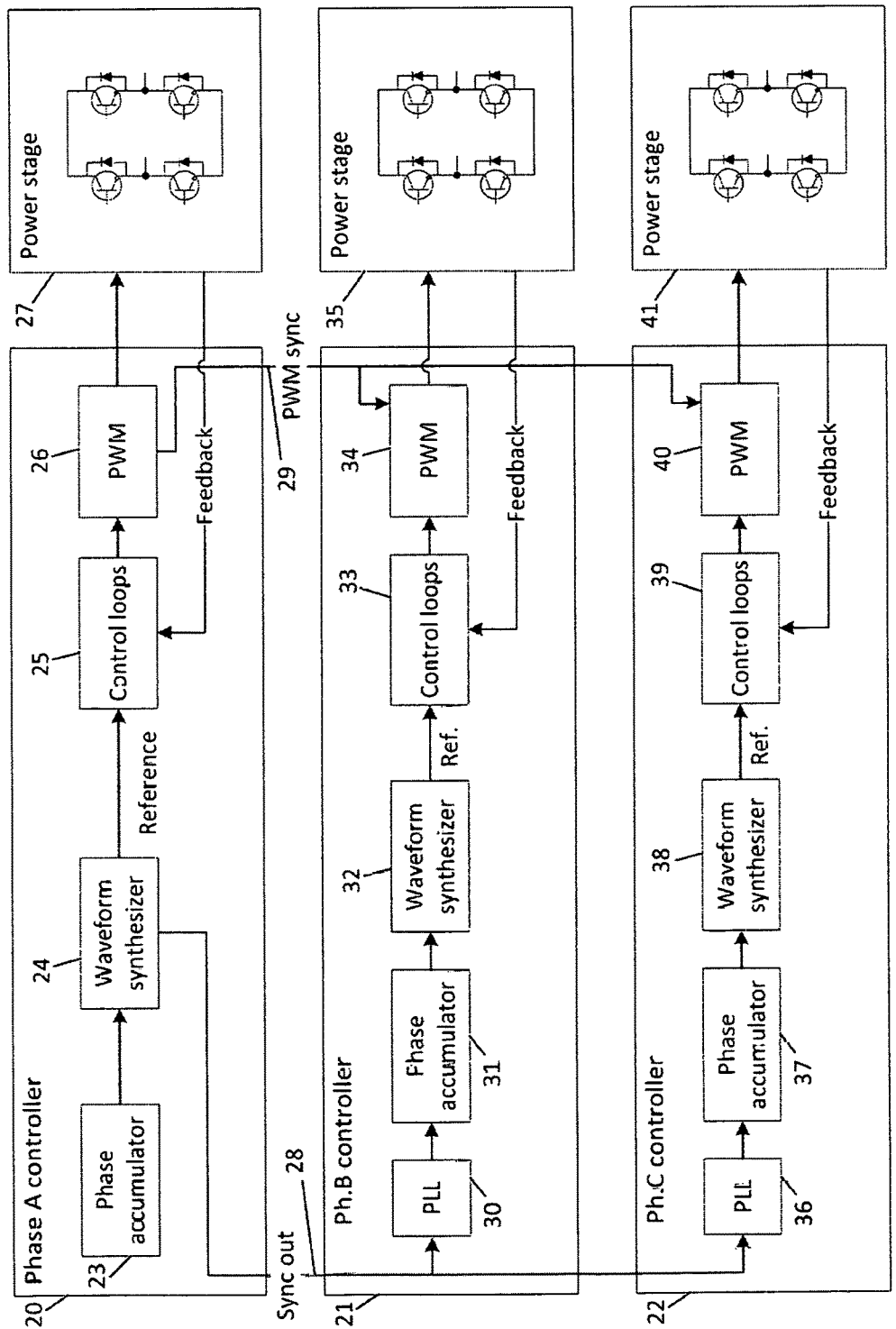
FIG. 3 is a schematic diagram of prior art where three separate single-phase inverters are used to generate a three-phase output.

In the preferred embodiment, the digital sync signal (70) is also used to synchronize the PWM clocks. Synchronized PWM modules provide phase shift and optimized interleaving, as described in FIG. 3.

In the preferred embodiment of this invention, the real-time data packet consists of a 32-bit phase value, a 4-bit command code and a 4-bit error detecting code (e.g. cyclic redundancy check or CRC), thus totaling 5 bytes of data. Modern SPI or SCI interfaces run at 20 Mbps or higher rates, thus allowing a theoretical maximum of 500 kHz sampling frequency, enough for most high performance AC power supply applications.

The individual control loops (66, 74, 82) take the synthesized waveforms as their setpoints and use the feedback from the power stages (e.g. voltage or current) to determine the PWM pulses (67, 75, 83) that control the power stages switching (72, 76, 86). A first power stage (72), a second power stage (76), and a third power stage (86) are also identified. The command processors (69, 78, 81) provide command actions to the control loop, such as enable, disable and amplitude changes. Since the phase accumulator and the command code are transferred together in the same packet, all three controllers execute the action at the same sampling lime.

In the scheme presented in FIG. 4, there is a unique phase accumulator (63), so the output frequency is determined by the phase delta value implemented in phase A. In order to perform frequency sweeps or modulation, frequency changes of the three-phase system can be executed in real time by modifying the phase delta register of the DDS (50). The phase shift from phase B to A and C to A is implemented in each controller (87 and 88) and can be also modified in real-time to provide any phase angle, as required in test and measurement applications.

With the DDS scheme split in two as described in this invention, seamless synchronization between phases is provided while also minimizing the amount of information transmitted between controllers. Optimizing the required data bandwidth allows to simplify and reduce circuit size and cost when all controllers are part of the same unit. Furthermore, since only 2 unidirectional signals are required, this scheme can be implemented when the 3 controllers are in different units (i.e. 3 separate single-phase AC supplies), using cables to transmit the signals and digital isolators to provide galvanic isolation.

The architecture in this invention can be applied to control also a different number of phases, such as 2, 4, or any poly-phase system. Furthermore, it can be applied to other types of equipment that do not make use of switching power stages, such as linear amplifiers and function generators.

In the preferred embodiment the waveform synthesizers (65, 73, 80) are based on a look-up table that contains arbitrary waveforms as required by the application (including sine waves) and can be changed in real-time by the controller. To minimize distortion, linear interpolation is used to calculate the waveform value between table samples.

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A digital controller for three phase AC sources, comprising:
   a first, a second, and a third controller;
   the first controller having a phase accumulator and command control, the output of the phase accumulator and command control providing input to a waveform synthesizer and a command processor, and the waveform synthesizer providing a reference input to a control loops and the command processor providing a command input to the control loops and a synchronization generator providing an input to the control loops, and the control loops providing an input to a pulse width modulator and the pulse width modulator providing an input to the power stage and the power stage providing a feedback to the control loops;
   the second controller receiving and adding the output of the phase accumulator and the command control to provide an input to a second controller waveform synthesizer, and the outputs of the phase accumulator and command control forming an input to a second controller command processor, and the second controller waveform synthesizer providing an input to a second controller control loops and the second controller command processor providing an input to the second controller control loops and the synchronization generator providing an input to the second controller control loops, and the second controller control loops providing an input to a second controller pulse width modulator and the second controller pulse width modulator providing an input to the second power stage and the second power stage providing a feedback to the second controller control loops; and
   the third controller receiving and adding the output of the phase accumulator and the command control to provide an input to a third controller waveform synthesizer, and the outputs of the phase accumulator and command control forming an input to a third controller command processor, and the third controller waveform synthesizer providing an input to a third controller control loops and the third controller command processor providing an input to the third controller control loops and the synchronization generator providing an input to the third controller control loops, and the third controller control loops providing an input to a third controller pulse width modulator and the third controller pulse width modulator providing an input to the third power stage and the third power stage providing a feedback to the third controller control loops.

2. A digital controller for three phase AC sources, comprising:
   a master controller, a first, a second, and a third slave controllers;

the master controller having a phase accumulator, a command control, and a synchronization generator, the output of the phase accumulator and the command control being sent over a real-time data bus in a unique packet to the slave controllers, the synchronization generator providing a periodic signal used by the slave controllers to synchronize;

the first, second and third slave controllers receiving and adding the output of the phase accumulator and the command control to provide an input to a waveform synthesizer, and the outputs of the phase accumulator and the command control forming an input to a controller command processor, and the waveform synthesizer providing an input to a control loops and the command processor providing an input to the control loops and the synchronization generator providing an input to the control loops, and the control loops providing an input to a pulse width modulator and the pulse width modulator providing an input to the power stage and the power stage providing a feedback to the control loops.

3. A digital controller for polyphase AC sources, comprising:

a master controller and slave controllers;

the master controller having a phase accumulator, a command control, and a synchronization generator, the output of the phase accumulator and the command control being sent over a real-time data bus in a unique packet to the slave controllers, the synchronization generator providing a periodic signal used by the slave controllers to synchronize;

each of the slave controllers receiving and adding the output of the phase accumulator and the command control to provide an input to a waveform synthesizer, and the outputs of the phase accumulator and the command control forming an input to a controller command processor, and the waveform synthesizer providing an input to a control loops and the command processor providing an input to the control loops and the synchronization generator providing an input to the control loops, and the control loops providing an input to a pulse width modulator and the pulse width modulator providing an input to the power stage and the power stage providing a feedback to the control loops.

4. The digital controller for polyphase AC sources as in claim 3 further comprising a single CPU clock for all controllers.

\* \* \* \* \*